United States Patent [19]

Sashiki et al.

[11] Patent Number: 4,508,186

[45] Date of Patent: Apr. 2, 1985

[54] WEIGHING METHOD AND APPARATUS THEREFOR

[75] Inventors: Takashi Sashiki, Nagaokakyo; Keiko Sakaeda, Kyoto, both of Japan

[73] Assignee: Kabushiki Kaisha Ishida Koki Seisakusho, Kyoto, Japan

[21] Appl. No.: 459,940

[22] Filed: Jan. 21, 1983

[30] Foreign Application Priority Data

Jan. 22, 1982 [JP] Japan ................................. 57-8376

[51] Int. Cl.³ ..................... G01G 19/00; G01G 19/22; G01G 19/52
[52] U.S. Cl. .......................................... 177/1; 177/25; 177/50; 364/567
[58] Field of Search ................ 177/1, 25, 50, DIG. 12; 364/567

[56] References Cited

U.S. PATENT DOCUMENTS 3,643,752  2/1972  Blodgett ........................... 177/50 X
4,397,364  8/1983  Hirano ................................. 177/25

Primary Examiner—E. A. Goldberg
Assistant Examiner—Patrick W. Foster
Attorney, Agent, or Firm—Staas & Halsey

[57] ABSTRACT

A weighing method and apparatus for charging articles to be weighed into a plurality of weighing hoppers, measuring the weights of batches of the charged articles by weight sensors, selecting, based on the measured weight of each article batch, a combination of the articles batches giving a total weight closest to a target weight value, and discharging the selected article batches from the weighing hoppers. In charging articles into the weighing hoppers, the weighing method includes a step of controlling a dispersing feeder so as to charge the articles into the weighing hoppers with a target charge quantity which is determined on the basis of the number of weighing hoppers and the target weight value, and which serves as the target of the charging operation. The result is a highly accurate weighing operation. The weight of articles charged into an auxiliary hopper is determined based on the extent to which the weights of unselected article batches deviate from the target weight value, and control is effected so as to minimize the deviation for the overall system.

18 Claims, 7 Drawing Figures

WEIGHING METHOD AND APPARATUS THEREFOR

CROSS-REFERENCE TO RELATED APPLICATION

This application is related to U.S. application Ser. No. 428,291 filed Sept. 29, 1982 and assigned to the Assignee of the subject application.

BACKGROUND OF THE INVENTION

This invention relates to a weighing method and apparatus for obtaining articles of a weight closest to a target weight value. More particularly, the invention relates to a weighing method and apparatus for weighing out batches of articles with great accuracy wherein the articles in a batch have unit weights which differ from one another, such articles being agricultural products such as green peppers and potatoes, livestock foodstuffs such as meat and broilers, perishable foods, fruits and fabricated parts.

According to a combinatorial weighing method which is known in the art, combinatorial weighing is carried out by weighing articles which have been introduced into a plurality of weighing hoppers, selecting the combination of articles (referred to as the "optimum" combination) which gives a total weight value closest to a target weight value, discharging only the selected articles, subsequently replenishing the emptied weighing hoppers with new articles to prepare for the next combination, and continuing automatic weighing by thenceforth repeating the foregoing operations.

FIGS. 1 and 2 are views useful in explaining a combinatorial weighing apparatus for practicing the foregoing weighing method, in which FIG. 1 is a schematic view showing the general features of the apparatus, and FIG. 2 is a block diagram of a combination control unit. Numeral 11 in FIG. 1 denotes a main feeder of vibratory conveyance type. Articles to be weighed are introduced into the main feeder 11 and imparted with vibratory motion for a predetermined length of time so as to be dispersed radially outward from the center of the main feeder. Numerals 12, 12 . . . denote n-number of weighing stations which are arranged around the main feeder 11 along radially extending lines to receive the articles dispersed by the main feeder. Each weighing station 12 includes a dispersing feeder 12a, a pool hopper 12b, a pool hopper gate 12c, a weighing hopper 12d, a weight sensor 12e, and a weighing hopper gate 12f. The dispersing feeder 12a comprises an independently vibratable conveyance device for feeding the articles by means of vibration, or an independently operable shutter. In either case, each dispersing feeder 12a is so arranged that the designated amount of articles received from the centrally located main feeder 11 can be introduced into the corresponding pool hopper 12b disposed below it. The pool hopper gate 12c is provided on each pool hopper 12b in such a manner that the articles received in the pool hopper 12b are released into the weighing hopper 12d when the pool hopper gate 12c is opened. Each weighing hopper 12d is provided with a weight sensor 12e of its own. The weight sensor 12e is operable to measure the weight of the articles introduced into the corresponding weighing hopper, and to apply an electrical signal indicative of the measured weight to the combination control unit 20 shown in FIG. 2. The combination control unit then selects the combination of articles (the "optimum" combination) which gives a total weight closest to the target weight value, as will be described below in further detail. Each weighing hopper 12d is provided with its own weighing hopper gate 12f. A drive control unit 30, shown in FIG. 2, upon receiving the signals from each of the weight sensors, produces a signal to open only the weighing hopper gates 12f of those weighing hoppers 12d that give the optimum combination, these gates 12f discharging the articles from the corresponding weighing hoppers 12d into a common chute 13 where they are collected together. The collecting chute 13 has the shape of a funnel and is so arranged as to receive the articles from any of the circularly arrayed weighing hoppers 12d via the hopper gates 12f, which are located above the funnel substantially along its outer rim. The articles received by the collecting chute 13 are collected at the centrally located lower end thereof by falling under their own weight or by being forcibly shifted along the inclined wall of the funnel by a mechanical scraper or the like, which is not shown. The collecting chute 13 is provided with a timing hopper 14 at the lower end thereof for temporarily holding the collected articles. The arrival of an externally applied signal from a packaging machine or the like causes the timing hopper 14 to release the retained articles from the system.

Reference will now be had to the block diagram of FIG. 2 for a description of the combination control unit. Numeral 20 denotes the combination control unit which includes an n-bit (n=10) counter 21 for counting timing pulses TP of a predetermined frequency, and for generating all combinations of n-number of the weighing hoppers. These combinations will also be referred to as "combination patterns" where appropriate. Specifically, for n-number of weighing hoppers, n combinations are possible when each combination is composed of one weighing hopper from the total of n weighing hoppers, $n(n-1)/2!$ combinations are possible when each combination is composed of two weighing hoppers selected from said total, and, in general, $n(n-1)(n-2) \ldots (n-r+1)/r!$ combinations are possible when each combination is composed of r-number of weighing hoppers selected from said total of n weighing hoppers. Accordingly, when the n-bit binary counter 21 has counted $2^n-1$ timing pulses TP, a total of $2^n-1$ different bit patterns, from 000 . . . 001 to 111 . . . 111, will have been generated. Therefore, if correlation is established between the first bit and the first weighing hopper, between the second bit and the second weighing hopper, and between third through n-th bits and the third through n-th weighing hoppers, then the generated bit pattern will be an indication of the above-mentioned combination pattern.

A multiplexer 22, in accordance with the output bit pattern of the counter 21, provides an arithmetic unit 24 with read values (indicative of the weight of the article batches) from the weight sensors 12e of predetermined weighing hoppers. For instance, if the value of the count (the bit pattern) in counter 21 is 1000101011 when n=10, then the arithmetic unit 24 will receive the weight value outputs W1, W2, W4, W6, W10 from the weight sensors 12e attached to the first, second, fourth, sixth and tenth weighing hoppers, respectively. A target weight register 23, for storing a target weight value $W_a$, is connected to the arithmetic unit 24 to apply $W_a$ thereto. The arithmetic unit 24 computes, and delivers the absolute value of the difference between the total weight $\Sigma W_i$, delivered by multiplexer 22, and the target weight value $W_a$. More specifically, the arithmetic unit 24 performs the operation:

$$|\Sigma W_i - W_a| = A \qquad (1)$$

and produces A, representing the difference (hereafter referred to simply as the "deviation") between the total weight $\Sigma W_i$ of the combination and the target weight value $W_a$. Numeral 25 denotes a minimum deviation register whose initially set value is the target weight value $W_a$, but whose content is thenceforth updated in a manner to be described later. An optimum combination memory for storing the optimum combination pattern is designated at numeral 26. Numerals 27, 28 denote gates, and 29 a comparator which compares the magnitude deviation A, namely the output of the arithmetic unit 24, with the magnitude of the minimum deviation, denoted by B, stored in the minimum deviation register 25. When the inequality $A < B$ holds, the output of comparator 29 is such that the deviation value A is delivered for storage to the minimum deviation register 25 through the gate 27, and the content (combination pattern) of counter 20a is delivered for storage to the optimum combination memory 26.

The output of the optimum combination memory 26 is applied to a drive control unit 30 which, in accordance with the optimum combination bit pattern received from memory 26, opens the specified weighing hopper gates 12f (FIG. 1), causing the corresponding weighing hoppers 12d to discharge their articles into the chute 13 and, concurrently, causing the corresponding pool hopper gates 12c to open to supply the emptied weighing hoppers 12d with articles afresh.

The operation of the weighing apparatus will now be described. At the beginning, each of the pool hoppers 12b and weighing hoppers 12d contains a supply of the articles. The weight sensors 12e provided on the corresponding weighing hoppers 12d measure the weights of the articles within the respective weighing hoppers and produce the weight values W1 through W10 which are sent to the combination control unit 20. The n-bit (n=10) counter 21 counts the timing pulses TP having the predetermined frequency to produce $2^n - 1$ combination patterns. Thus, when the first timing pulse TP arrives and is counted, the content of counter 21 becomes 0000000001. As a result, the multiplexer 22 sends the first weight value signal W1, from the weight sensor 12e-1 provided on the first weighing hopper, to the arithmetic unit 24, which responds by performing the operation specified by equation (1) above, thereby producing the signal indicative of the deviation A $(=|W1-W_a|)$ between the total weight of the combination and $W_a$. Next, the comparator 29 compares A with the content B of the minimum deviation register 25 (the initial value of B being the target weight value $W_a$). Since the inequality $A < B$ naturally holds, the gates 27, 28 are opened that the deviation value A is transferred to and stored in the minimum deviation register 25, and the content (the combination pattern 0000000001) of n-bit counter 21 is stored in the optimum combination memory 26. Thenceforth, when the second timing pulse TP is generated, the pulse is counted by counter 21, whose content (combination pattern) is incremented to 0000000010. Consequently, the weight value output W2 of the weight sensor 12e provided on the second weighing hopper is delivered to the arithmetic unit 24 which then performs the operation of equation (1) to produce the signal indicative of the deviation value A $(=|W_2-W_a|)$. The comparator 24 compares the deviation value A with the content B $(=|W_1-W_a|)$ of the minimum deviation register 25. If the relation $A \leq B$ holds, then neither the register 25 nor the optimum combination memory 26 is updated; if $A < B$ holds, the deviation value A is transferred to and stored in the minimum deviation register 25, and the content of counter 21 is transferred to and stored in optimum combination memory 26. The operation described above is repeated until all $2^n - 1$ combinations have been generated. At such time, the content of the minimum deviation register 25 will be the minimum deviation value obtained from the $2^n - 1$ combinations, and the content of the optimum combination memory 26 will be the combination pattern that gave said minimum value. The optimum combination is thus selected from the total of $2^n - 1$ possible combination patterns.

The optimum combination pattern selected in the above manner is applied to the drive control unit 30 which opens the weighing hopper gates 12f of the weighing hoppers corresponding to the "1" bits in the optimum combination pattern, whereby these weighing hoppers release their articles into the chute 13, this batch of articles making up the optimum combination of articles. This will leave the selected weighing hoppers 12d empty. Subsequently, therefore, the pool hopper gates 12c corresponding to the empty weighing hoppers 12d are opened to introduce a fresh supply of the articles from the respective pool hoppers into said weighing hoppers 12d, leaving these pool hoppers empty. Accordingly, the dispersing feeders 12a which correspond to the empty pool hoppers 12b, are vibrated for a predetermined period of time to deliver a fresh supply of the articles to these pool hoppers. This restores the weighing apparatus to the initial state to permit resumption of the control operation for selecting the best weight combinations in the manner described. Thus, weighing by the combinatorial weighing apparatus may proceed in continuous fashion by repeating the foregoing steps.

With the conventional weighing method as described above, weighing errors can be held below the unit weight of the articles being weighed even when the articles have unit weights differing widely from one to another. Green peppers, for example, vary greatly from one to another in their unit weight. The same is true of potatoes and other agricultural products, livestock foodstuffs such as meats and broilers, and articles in general that cannot be shaped artificially. When weighing candies, snack foods and fabricated metal parts, moreover, the conventional method makes it possible to diminish the average weighing error.

When weighing out a target weight over and over with the prior-art method, however, the weighing error differs with each weighing operation, with the possibility that, ultimately, the total weight of a combination will no longer exist in the neighborhood of the target weight. For example, let us assume that from several dozen to several thousand articles having a comparatively small unit weight of about 5 g or less are to be gathered together and weighed out to a predetermined weight. The weighing error not only frequently exceeds the unit weight in such case, but is known to grow as large as 20 to 30 g. When a combined weight no longer exists near the target weight value, the conventional practice is to charge additional articles into each of the weighing stations to alter the weight in each station, followed by recomputing combinations. With such method, however, too large a value is likely to be weighed out owing to an excessive supply of the articles, thereby leading to a much greater weighing error.

SUMMARY OF THE INVENTION

Accordingly, an object of the present invention is to provide a weighing method and apparatus, based on a combinatorial scale, for executing a highly accurate weighing operation in which weighing error is greatly reduced.

Another object of the present invention is to provide a weighing method and apparatus so adapted that a target weight can be obtained from combinations which are large in number.

Still another object of the present invention is to provide a weighing method and apparatus for executing highly accurate weighing in which weighing error is greatly reduced, even when weighing out the same target weight repeatedly.

Yet another object of the present invention is to provide a weighing method and apparatus for executing highly accurate weighing, so adapted that articles will not remain in weighing hoppers for an extended period of time because the weighing hoppers containing these articles are repeatedly unselected for participation in an optimum combination.

A further object of the present invention is to provide a weighing method and apparatus capable of minimizing article batches of a weight which tends not to be selected for participation in optimum combinations.

According to the present invention, these and other objects are attained by provided a weighing method and apparatus wherein each of a plurality of weighing hoppers is supplied with articles having a mean weight of $2X/N$ (when N is even) or $2X/(N\pm1)$ (when N is odd), where the number of weighing hoppers is N and the target weight value is X. This makes it possible to perform highly accurate weighing by reducing weighing error. According to another feature of the invention, articles will not reside in the weighing hoppers for a prolonged period of time even when their weighing hoppers are not selected for participation in an optimum combination. This is accomplished by monitoring the tendency exhibited by the weights of the remaining article batches. For example, if the weight of a remaining article batch inclines toward the negative side or positive side with respect to the value $2X/N$, this is monitored so that a new feed quantity may be introduced to cancel the particular inclination. Articles therefore will not remain in any of the weighing hoppers for a prolonged period of time.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
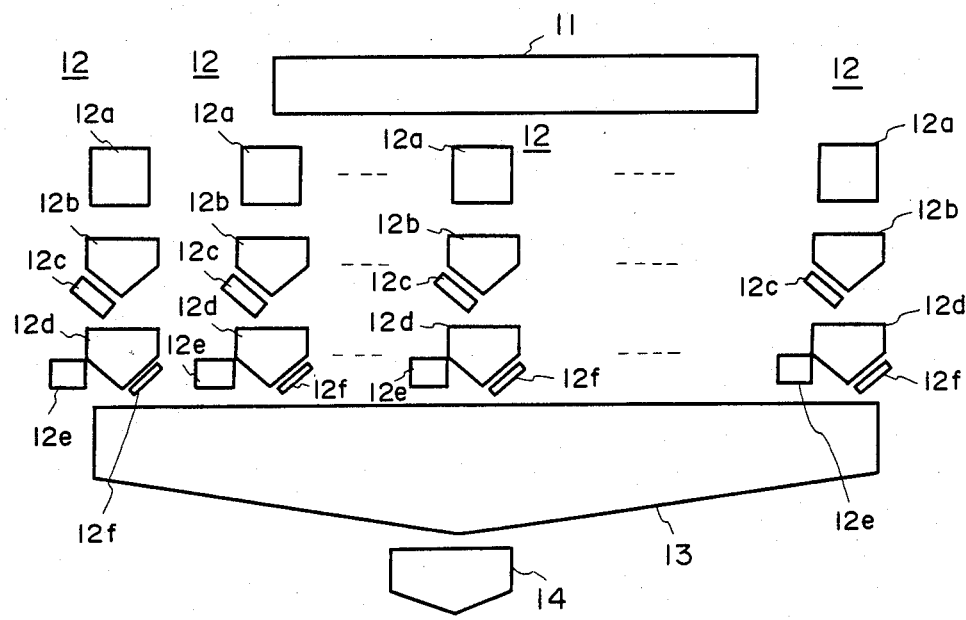
FIG. 1 is a schematic view of the general construction of a weighing apparatus useful in describing a weighing method according to the prior art.

According to the present invention, the weight of the articles introduced into each of the weighing stations is controlled in a manner which will now be described. Let us examine a case where X grams are to be weighed out in a combinatorial scale having N-number of weighing stations. The target weight value will therefore be X grams. To obtain the target weight, the amount of articles fed to each weighing station should be adjusted to have a mean value of $2X/N$ grams when N is even, and $2X/(N\pm1)$ grams when N is odd. The reason is as follows. The number of combinations that can be computed by a combinatorial scale composed of N weighing stations, where a combination may be made up of only one weighing machine or up to all N of the weighing machines, is $2^N-1$. When N is even, combinations composed of $N/2$ weighing machines will be the largest in number among said $2N-1$ combinations. When N is odd, combinations composed of $(N\pm1)/2$ weighing machines will be the largest in number among said $2^N-1$ combinations. Thus, if it can be arranged to obtain the target weight with the combinations that select the largest number of weighing stations, then the possibility of achieving an accurate weighing operation will improve correspondingly. Accordingly, when N is even, $N/2$ times the mean weight $W_m$ of the articles introduced into each weighing station should be equivalent to the target weight of X grams. When N is odd, $(N\pm1)/2$ times the mean weight $W_m$ of the articles introduced into each weighing station should be equivalent to the target weight of X grams. In accordance with the present invention, therefore, control is effected so that the mean weight of the articles introduced into each weighing station will be equivalent to $2X/N$ grams when N is even, and $2X/(N\pm1)$ grams when N is odd.

Thus, control is performed in such a manner that the dispersing feeders load articles into the corresponding weighing hoppers with $2X/N$ as the target for each weighing hopper when N is even, and with $2X/(N\pm1)$ as the target when N is even. Since the dispersing feeders are arranged in such a manner that the amount of articles charged into the weighing hoppers is decided by the amplitude and duration of vibration, the desired results may be obtained by finding the above-mentioned mean weight $W_m$ from the target weight value X and the number N of weighing stations, computing the vibration amplitude and duration corresponding to the mean weight $W_m$, and driving the dispersing feeders at the computed vibration amplitude for the computed period of time. By effecting control in this fashion, the weight of the batch of articles received in each of the weighing hoppers will not be uniformly equivalent to the mean weight $W_m$, but the mean value of these weights will be approximately equivalent to the mean weight $W_m$.

Next, as will be described in further detail below, there is a tendency for certain weighing hoppers not to be selected in a combinatorial weighing operation, making it progressively more difficult to obtain on optimum combination close to the target weight. According to another feature of the invention, therefore, a monitoring operation is carried out during combinatorial weighing to determine what trends are exhibited by the weights of the articles remaining in the unselected weighing hoppers. The control operation proceeds in a manner which will now be described.

Figure 3:
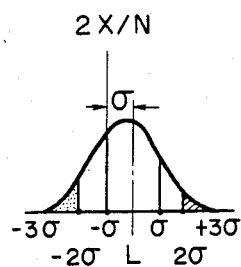
FIG. 3 is a distribution curve indicative of the weights of article batches charged into weighing stations, and is useful in describing the principle of the present invention.

Assume that articles are being introduced at a regular distribution where the mean weight introduced into N-number of weighing stations is L grams and the standard deviation from L is $\sigma$ grams (see FIG. 3). N shall be an even number.

Though the desired relation is $L=2X/N$, over supply and under supply tend to occur, so that the actual condition which prevails is given by:

$$L=(2X/N)+\sigma$$

With the articles being supplied in this manner, those article batches exhibiting a deviation near $-3\sigma$ are likely to be selected, while those having a deviation near $+3\sigma$ are not. The reason is that articles are not present for cancelling or offsetting the deviation of $+3\sigma$. When the weighing cycle is repeated again and again in the automatic weighing operation, therefore, the article batches with the deviation in the vicinity of $+3\sigma$ continue to remain unselected and make up a large part of the N number of article batches. Under such conditions, the result is a larger weighing error so that desirable combinations fail to appear.

According to the invention, therefore, control is executed by monitoring the trend exhibited by the weights of the article batches remaining in the unselected weighing hoppers, such as by monitoring whether the weight of each remaining batch of articles is inclining toward the positive side or negative side with respect to 2X/N, and creating a new article charge quantity in such fashion as to cancel the particular inclination, so that articles will not reside in the weighing hoppers for a prolonged period of time.

Figure 4:
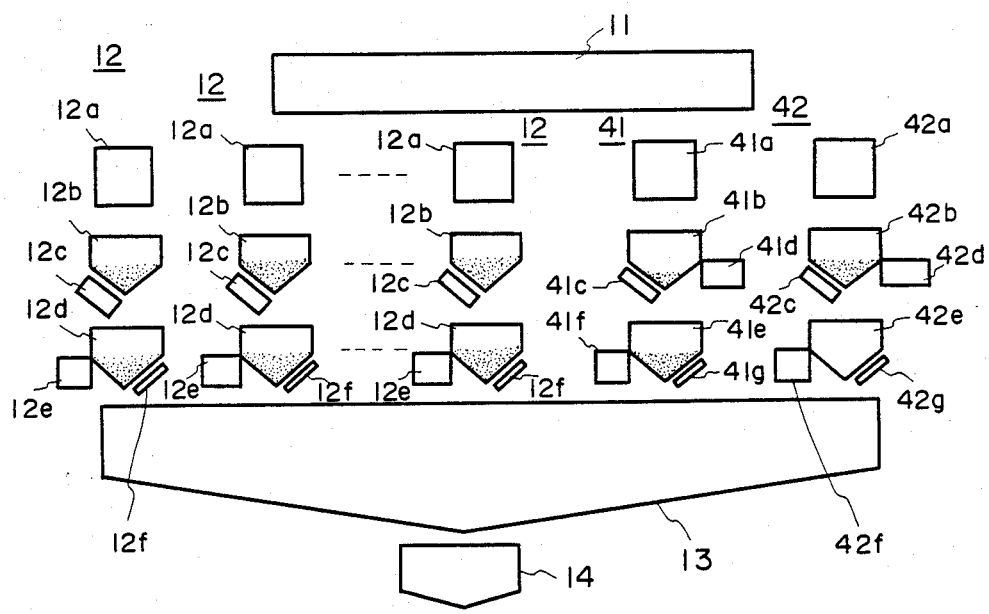
FIG. 4 is a schematic view of the general construction of a weighing apparatus embodying the present invention.
Figure 5:
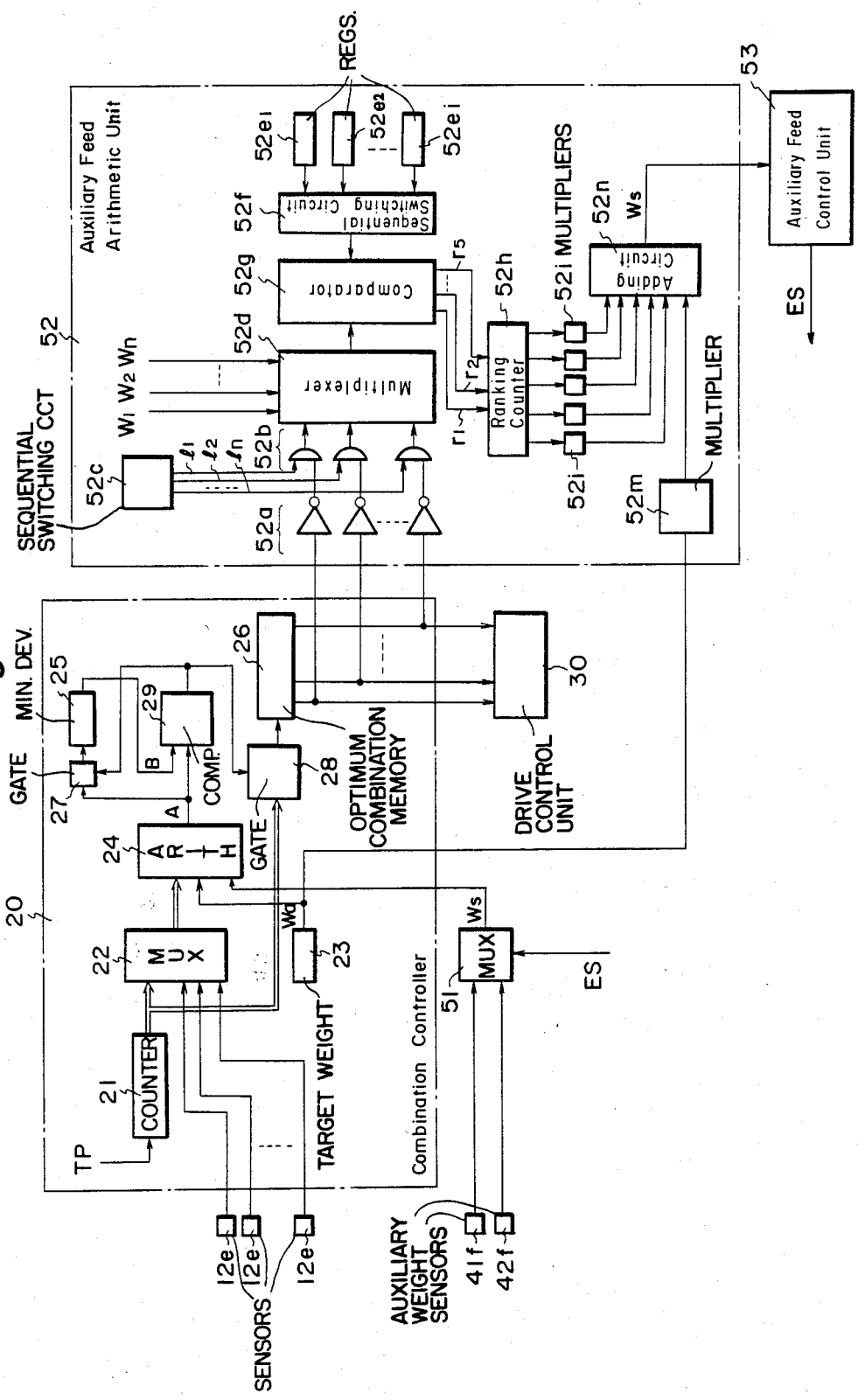
FIG. 5 is a block diagram of the weighing apparatus embodying the present invention.

Reference will now be had to FIGS. 4 and 5 illustrating a weighing apparatus for practicing the weighing method of the present invention, in which FIG. 4 is a schematic view of the mechanical features of the apparatus, and FIG. 5 is a block diagram of the associated circuitry.

Referring first to FIG. 4, it will be seen that the apparatus is distinguishable over the prior-art arrangement of FIG. 1 in that there are provided auxiliary weighing stations 41, 42, and in that (N−1)-number of weighing stations 12 are provided. Other portions which are similar to those shown in FIG. 1 are designated by like reference characters and are not described in detail again.

The auxiliary weighing stations 41, 42 include respective auxiliary dispersing feeders 41a, 42a, auxiliary pool hoppers 41b, 42b, auxiliary pool hopper gates 41c, 42c, pool hopper weight sensors 41d, 42d for measuring the weights of articles charged in the auxiliary pool hoppers 41b, 42b, respectively, auxiliary weighing hoppers 41e, 42e, auxiliary weight sensors 41f, 42f, and auxiliary weighing hopper gates 41g, 42g. The auxiliary weighing stations 41, 42 correspond to the weighing stations 12 (serving as the main weighing stations). The auxiliary dispersing feeders 41a, 42a, auxiliary pool hoppers 41b, 42b, auxiliary weighing gates 41c, 42c, pool hopper hoppers 41e, 42e, auxiliary weight sensors 41f, 42f and auxiliary hopper gates 41g, 42g correspond to, and have the same construction as, the dispersing feeders 12a, pool hoppers 12b, pool hopper gates 12c, weighing hoppers 12d, weight sensors 12e and weighing hopper gates 12f. The pool hopper weight sensors 41d, 42d sense the weights of articles introduced into the pool hoppers 41b, 42b, respectively, and deliver signals indicative of the sensed weight values to an auxiliary dispersing feed control unit, which will be described below with reference to FIG. 7. Control is effected by the control unit in such a manner that the weight of the articles introduced into auxiliary pool hopper 41b or 42b will be equivalent to an auxiliary feed quantity (weight value) $W_s$ computed in an auxiliary feed arithmetic unit, described below.

Figure 2:
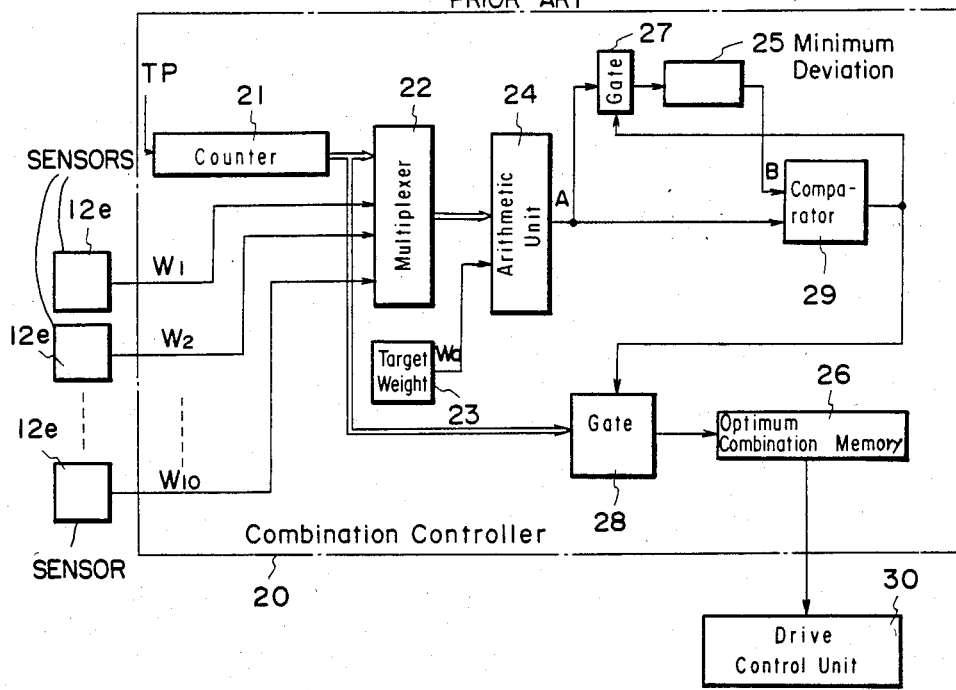
FIG. 2 is a block diagram of a combination control unit in a weighing apparatus, used for describing a weighing method according to the prior art.

Next, reference will be had to the block diagram of FIG. 5 to describe the electrical system for practicing the weighing method of the invention. Portions similar to those shown in the conventional arrangement of FIG. 2 are designated by like reference characters and need not be described again. In FIG. 5, the blocks indicated at numeral 12e are the weight sensors provided on the corresponding weighing hoppers. As in FIG. 2, numeral 20 denotes the combination control unit, and 30 the drive control unit. The blocks indicated at numerals 41f, 42f are the auxiliary weight sensors provided on the corresponding auxiliary weighing hoppers 41e, 42e. Signals from the auxiliary weight sensors 41f, 42f, indicative of the weights measured thereby, are applied to a multiplexer 51 which, in response to a switching signal ES from the auxiliary feed control unit, described below, alternatingly applies one of the outputs received from the auxiliary weight sensors 41f, 42f to the arithmetic unit 24 of the combination control unit 20 as a signal $W_s$ indicative of the measured weight. The combination control unit 20 selects the optimum combination through a control operation substantially the same as that described above in connection with FIG. 2. In this case, however, the arithmetic unit 24 also receives the weight value output $W_s$ from the multiplexer 51 and performs the following arithmetic operation instead of that given by Eq. (1) above:

$$|\Sigma W_i + W_s - W_a| = A \qquad (2)$$

Thus, the combination control unit 20 always selects the weight of the articles from one of the auxiliary weighing hoppers 41e, 42e as one constituent of the optimum combination, and selects the other constituents of the optimum combination from the (N−1)-number of weighing hoppers 12d.

Designated at 52 is the auxiliary feed arithmetic unit, and at 53 the auxiliary feed control unit, referred to above. The auxiliary feed arithmetic unit 52 includes NOT gates 52a, AND gates 52b, a sequential switching circuit 52c, and a multiplexer 52d. The inputs to the NOT gates 52a are single bits in the optimum combination pattern stored in the optimum combination memory 26. Since the bits corresponding to the weighing hoppers not selected for participation in an optimum combination are "0" bits, only the outputs of NOT gates 52a corresponding to the unselected weighing hoppers will be logical "1". The sequential switching circuit 52c is adapted to produce "1" signals sequentially on lines $l_1, l_2, \ldots, l_n$ at a predetermined period. As a result, the AND gates 52b corresponding to weighing hoppers which do not participate in an optimum combination deliver logical "1" signals sequentially to the multiplexer 52d, the latter functioning to provide a comparator circuit 52g with the weight $W_i$ of the articles contained in each of the unselected weighing hoppers.

In order to rank the batches of articles in the weighing hoppers in accordance with the magnitude of the deviation between the mean weight $W_m$ (=2X/N) of the introduced articles and the actual weight of the articles in each hopper, the auxiliary feed arithmetic unit 52 is provided with registers $52e_1, 52e_2, \ldots 52e_i$ for storing rank boundary values. Thus, numeral $52e_1$ denotes a first rank boundary value register, $52e_2$ a second rank boundary value register and, in general, $52e_i$ an i-th rank boundary value register. Letting (N-M) be the number of weighing hoppers 12d (where M is the number of auxiliary weighing hoppers) and $W_a$ the target weight, and assuming that N is an even number, the mean weight $W_m$ of the articles introduced into each of the weighing hoppers 12d will be given by:

$$W_m = 2X/N$$

Figure 6:
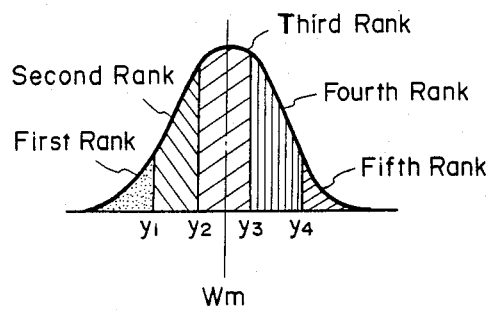
FIG. 6 is a graph of deviation ranks for describing the operation of the apparatus shown in FIG. 5.

As illustrated in FIG. 6, in accordance with the preferred embodiment, the ranks of the measured article weight values are divided into first through fifth ranks about a central value which is the mean weight $W_m$. The first rank indicates article weights of less than $y_1$ grams, the second rank article weights of between $y_1$ and $y_2$ grams, the third rank article weights of between $y_2$ and $y_3$ grams, the fourth rank article weights of between $y_3$ and $y_4$ grams, and the fifth rank article weight of above $y_4$ grams. The first rank is furthest from the mean weight $W_m$ on the negative side, and the fifth rank is furthest from the mean weight $W_m$ on the positive side.

The auxiliary feed arithmetic unit 52 further includes a sequential switching circuit 52f for sequentially selecting, at a predetermined period, the rank boundary values stored in the first through i-th rank boundary value registers $52e_1$ through $52e_i$, the selected values being delivered to the comparator circuit 52g. The latter is adapted to compare the weight values $W_i$ of the unselected article batches, received sequentially from the multiplexer 52d, with the data stored in each of the rank boundary value registers, and to determine the rank of each unselected batch of articles, a signal indicative of the latter being applied to a ranking counter unit 52h. The ranking counter unit 52h includes counters for respective ones of the five ranks mentioned above for counting the number of article batches belonging to each rank. The counter outputs are applied to constant multipliers 52i provided for respective ones of the five ranks. The constant multipliers 52i are so-called weighing circuits for weighting the first rank with 2w, the second rank with w, the third rank with 0, the fourth rank with $-w$, and the fifth rank with $-2w$. For example, letting $m_i$ (i=1,2, ..., 5) be the number of article batches belonging to the i-th rank (i=1,2, ... 5), the constant multipliers 52i will deliver the following weighted values, respectively: $+2w \cdot m_1$, $+w \cdot m_2$, 0, $-w \cdot m_4$, $-2w \cdot m_5$. As for the value of w, this can be set to $\sigma$ assuming that the width of each of the second, third and fourth ranks is $\sigma$. The auxiliary feed arithmetic unit 52 also has a multiplier 52m for multiplying the target weight $W_a$ by 2/(N+1), and an adding circuit 52n. The latter adds together the outputs from each of the constant multipliers 52i and the output of the multiplier 52m to produce an auxiliary feed signal $W_s$ indicating the weight of articles to be introduced into one of the pool hoppers 41b, 42b.

Thus, the auxiliary feed arithmetic unit 52 functions to determine whether the weight of each article batch which does not participate in an optimum combination is inclining toward the positive or negative side of the mean weight 2X/N. The unit 52 also computes the auxiliary feed quantity $W_s$ indicating the weight of the articles to be charged into the auxiliary weighing hoppers 41e, 42e (FIG. 4), based on said determination, in such fashion as to cancel the particular inclination or, in other words, to assure that articles will not reside in any of the weighing hoppers for a prolonged period of time.

Figure 7:
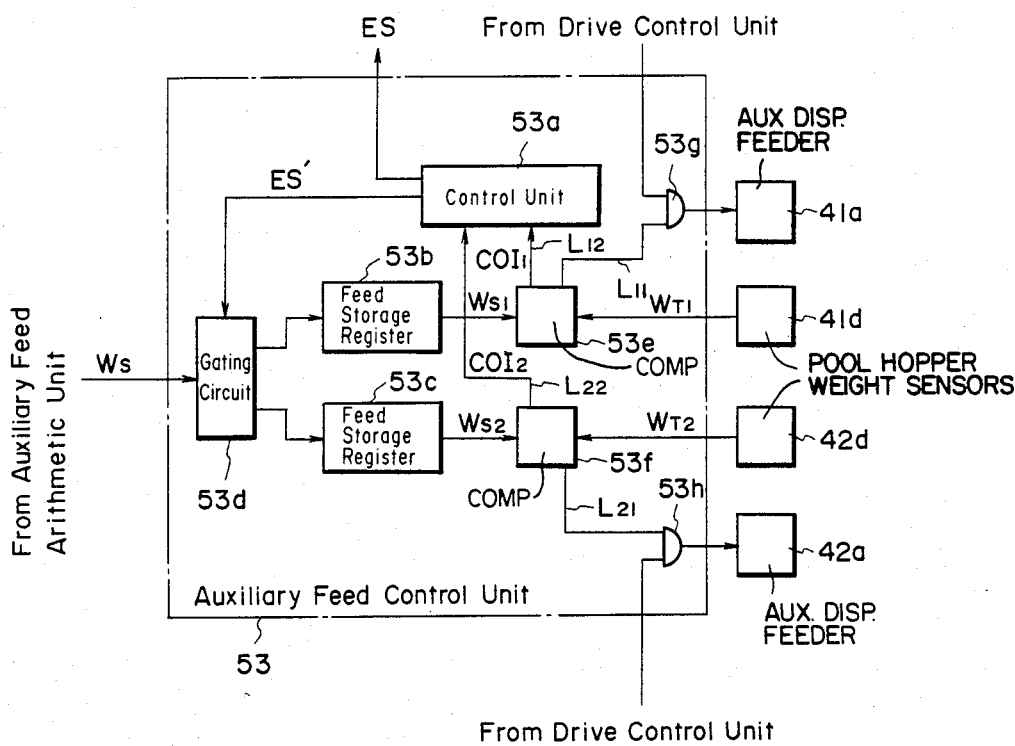
FIG. 7 is a block diagram of an essential portion of the arrangement shown in FIG. 5.

The auxiliary feed control unit 53, as shown in greater detail in the block diagram of FIG. 7, comprises a controller 53a; feed storage registers 53b, 53c set alternately to the auxiliary feed quantity $W_s$ which enters from the auxiliary feed arithmetic unit 52 (FIG. 6) a gating circuit 53d for applying the auxiliary feed quantity $W_s$ to the feed storage registers 53b, 53c alternately, and comparators 53e, 53f for comparing the auxiliary feed quantity, denoted $W_{s1}$ and $W_{s2}$ when stored in the registers 53b, 53c, respectively, with output values $W_{T1}$, $W_{T2}$ from the pool hopper weight sensors 41d, 42d. The comparators 53a, 53f deliver logical "1" on line $L_{11}$ when $W_{s1} > W_{T1}$ holds or on line $L_{21}$ when $W_{s2} > W_{T2}$ holds, a coincidence signal $COI_1$ on line $L_{12}$ when $W_{s1} = W_{T1}$ or a coincidence signal $COI_2$ on line $L_{22}$ when $W_{s2} = W_{T2}$. The lines $L_{11}$, $L_{21}$ are connected to the input side of AND gates 53g, 53h, respectively.

The weighing method of the present invention will now be described in detail with reference to FIGS. 4, 5 and 7.

For starting conditions, assume that batches of articles to be weighed have been introduced into the N-number of weighing hoppers 12d and pool hoppers 12b and into the auxiliary weighing hopper 41e and auxiliary pool hopper 42b, that the auxiliary weighing hopper 42e is empty, and that the auxiliary pool hopper 41b contains only a small amount of the articles. The situation is as illustrated in FIG. 4, where the accumulations of the articles in the various hoppers are shown, with auxiliary weighing hopper 42g being shown empty. We will also assume that the multiplexer 51 (FIG. 5) responds to the switching signal ES from the auxiliary feed control unit 53 by applying the output (weight value) $W_s$ from the auxiliary weight sensor 41f to the arithmetic unit 24 of the combination controller 20.

The weight sensors 12e provided on the corresponding weighing hoppers 12d measure the weights of the article batches contained in these hoppers, and provide the combination control unit 20 with signals indicative of the measured weight values $W_1$ through $W_n$. The n-bit counter 21 counts the timing pulses TP of the predetermined period, sequentially producing $2^n - 1$ different combination patterns. Each time a new combination pattern is generated, the arithmetic unit 23 performs the operation of Eq. (2) to produce the deviation value A, and the comparator 29 compares A with the content B of the minimum deviation register 25. When $A \geq B$ holds, neither the register 25 nor the optimum combination memory 26 is updated. When $A < B$ holds, the deviation value A is transferred to and stored in the minimum deviation register 25, and the content of counter 21 is transferred to and stored in optimum combination memory 26. The operation described above is repeated until all $2^n-1$ combinations have been generated. At such time the content of the minimum deviation register 25 will be the minimum deviation value obtained from the $2^n-1$ combinations, and the content of the optimum combination memory 26 will be the combination pattern that gave said minimum value. The optimum combination is thus selected from the total of $2^n-1$ possible combination patterns, thereby ending this cycle of combinatorial computations. The optimum combination pattern selected in the above manner is applied to the drive control unit 30 which opens the designated weighing hopper gates 12f and the auxiliary weighing hopper gate 41g on the basis of the optimum combination pattern, whereby the corresponding weighing hoppers 12d and auxiliary weighing hopper 41e release their articles into the chute 13, this collection of articles making up the optimum combination of articles. These articles are received in the timing hopper 14. Then, after the passage of a preset length of time, the emptied weighing hopper gates 12f and auxiliary weighing hopper gate 41g are closed. This is followed by opening the corresponding pool hopper gates 12c so that those of the weighing hoppers 12d which have been emptied may receive a fresh supply of articles from the corresponding pool hoppers 12b, and by opening the auxiliary pool hopper gate 42c so that the articles contained in the auxiliary pool hopper 42b may be loaded into the auxiliary weighing hopper 42e. Next, after the passage of a predetermined length of time, the open pool hopper gates 12c and the open auxiliary pool hopper gate 42c are closed, and the main feeder 11, as well as those of the distributing feeders 12a corresponding to the weighing hoppers just selected, is vibrated for a predetermined period of time to introduce articles into the emptied pool hoppers 12b. It should be noted that the vibration amplitude and duration are preset in such a manner that each pool hopper 12b will receive articles the mean weight of which is $W_m$ $(=2X/N)$. Furthermore, at the same time that the articles are introduced into these pool hoppers 12b, the auxiliary dispersing feeder 41a is vibrated in such a manner that the auxiliary pool hopper 41b, which already contains a small quantity of articles, will be supplied with articles to give a weight equivalent to the auxiliary feed quantity $W_s$ computed by the auxiliary feed arithmetic unit 52. The auxiliary pool hopper 42b, meanwhile, is supplied with a small quantity of articles by the dispersing feeder 42a. Note that the auxiliary feed quantity $W_s$ is a value which is preset immediately after the start of the weighing operation, but is computed by the auxiliary feed arithmetic unit 52 from the second weighing cycle onward in a manner as will now be described.

When the optimum combination pattern is stored in the optimum combination memory 26, said pattern is applied to the NOT gates 52a of the auxiliary feed arithmetic unit 52. Since the bits in the combination pattern that correspond to the unselected weighing hoppers will be logical "0", only the NOT gates 52a corresponding to these unselected weighing hoppers will produce "1" outputs. Since the sequential switching circuit 52c delivers "1" signals sequentially on lines $l_1, l_2, \ldots l_n$ at a predetermined period, those of the AND gates 52b corresponding to the unselected weighing hoppers will deliver "1" signals sequentially to the multiplexer 52d. The multiplexer 52d responds by supplying the comparator circuit 52g sequentially with the weights $W_i$ of the article batches contained in the unselected weighing hoppers 12d. Meanwhile, the sequential switching circuit 52f, at a period shorter than that at which the sequential switching circuit 52c operates, is sequentially selecting each of the rank boundary values stored in the first, second, . . . fifth rank boundary value registers $52e_1, 52e_2, \ldots 52e_5$ and is applying them to the comparator circuit 52g. As a result, the comparator circuit 52g decides which rank each of the weight values from the multiplexer 52d falls into and produces a "1" on line $r_1$ when the weight value falls in the first rank, a "1" on line $r_2$ when the weight value falls in the second rank, and so on through line $r_5$ when the weight values falls in the fifth rank. The counters 52h for the respective ranks are incremented each time a "1" appears on the corresponding lines $r_i$ ($i=1,2,\ldots 5$). Thus, the rank counters 52h perform a monitoring operation to keep track of the deviation between the mean weight $W_m$ ($=2X/N$) and the weight of each of the unselected article batches. The values $m_i$ ($i=1,2,\ldots,5$) counted by the counters 52h are weighted by means of the respective constant multipliers 52i. The resulting weighed values, namely $2w \cdot m_1$, $w \cdot m_2$, 0, $-w \cdot m_4$, $-2w \cdot m_5$ are applied to the adding circuit 52n, which then finds the auxiliary feed quantity $W_s$ by performing the operation:

$$W_s = 2w \cdot m_1 + w \cdot m_2 - w \cdot m_4 - 2w \cdot m_5 + 2X/(N+1)$$

The computed auxiliary feed quantity $W_s$ is applied to the auxiliary feed control unit 53 (FIG. 7).

The controller 53a in the auxiliary feed control unit 53 applies a switching signal ES' to the gating circuit 53d, whereby the auxiliary feed quantity $W_s$ is stored in the feed storage register 53b through the gating circuit 53d. When the operation for selecting the optimum combination ends, the drive control unit 30 causes the dispersing feeders 12a corresponding to the weighing hoppers selected for the optimum combination to vibrate for a fixed time period to charge articles into the emptied pool hoppers 12b. At the same time, articles are introduced into the auxiliary pool hopper 41b in such fashion that the total weight of these articles will be equivalent to the auxiliary feed quantity $W_s$. The control operation for assuring that this will be performed is executed by the auxiliary feed control unit 53. Specifically, the auxiliary dispersing feeder 41a (FIGS. 4 and 7) is set into vibration by a drive signal from the drive control unit 30 to introduce articles into the auxiliary pool hopper 41b. The weight $WT_1$ of the articles introduced into the auxiliary pool hopper 41b is sensed by the pool hopper weight sensor 41d and then applied to the comparator circuit 53e. The latter, since it is also receiving the auxiliary feed quantity $W_{s1}$, compares the output $WT_1$ of the pool hopper weight sensor 41d and the auxiliary feed quantity $W_{s1}$. As long as these two inputs do not agree, the output of AND gate 53g is logical "1", causing the auxiliary distributing feeder 41a to continue vibrating, so that articles continue to be charged into the auxiliary pool hopper 41b. When $WT_1$ and $W_{s1}$ agree, the output of AND gate 53g goes to logical "0", terminating the supply of articles to the auxiliary pool hopper 41b. The coincidence signal $COI_1$ is simultaneously applied to the controller 53a. The latter responds to the signal $COI_1$ by producing the switching signals ES, ES', thereby switching over the output of multiplexer 51 (FIG. 5) and of the gating circuit 53d. Automatic weighing performed by the combinatorial scale proceeds as the foregoing control operation is repeated with respect to feed storage register 53c, comparator 53f, distributing feeder 42a and pool hopper weight sensor 42d.

In accordance with the present invention as described above, each of the weighing hoppers is supplied with articles having a mean weight of 2X/N (when N is even) or 2X/(N±1) (when N is odd), where the number of weighing hoppers is N and the target weight value is X. This makes it possible to perform highly accurate weighing by reducing weighing error.

Furthermore, according to the invention, articles will not reside in the weighing hoppers for a prolonged period of time even when their weighing hoppers are not selected for participation in an optimum combination. In other words, the tendency exhibited by the weights of the remaining article batches is monitored. For example, if the weight of a remaining article batch inclines toward the negative side or positive side with respect to the value 2X/N, this is monitored so that a new feed quantity may be introduced to cancel the particular inclination. Articles therefore will not remain in any of the weighing hoppers for a prolonged period of time. This enables combinatorial weighing to proceed with great accuracy as it completely eliminates the phenomenon wherein article batches which tend not to be selected remain in their weighing hoppers, so that desirable combinations gradually fail to appear.

As many apparently widely different embodiments of the present invention can be made without departing from the spirit and scope thereof, it is to be understood that the invention is not limited to the specific embodiments described herein, except as defined in the appended claims.

What we claim is:

1. A weighing method comprising the steps of:
   (a) charging articles to be weighed into a plurality of weighing hoppers;
   (b) measuring the weight of each batch of articles received in the respective weighing hoppers;
   (c) selecting, based on the measured weights, a combination of article batches giving a total weight value closest to a target weight value within preset limits; and
   (d) discharging the selected article batches from the respective weighing hoppers to obtain a collection of articles the weight of which corresponds to the total weight value closest to the target weight value within preset limits;
   said step (a) including controlling the charging of the articles into the weighing hoppers on the basis of a target charge quantity, obtained from the number of weighing hoppers and the target weight value, which serves as a target for the charging operation, said step (a) also including charging the articles into each of the weighing hoppers with a weight value of 2X/N serving as the target charge quantity when N is even, and with a weight value of 2X/(N±1) as the target charge quantity when N is odd, where N is the number of weighing hoppers and X is the target weight value.

2. The weighing method according to claim 1, wherein said step (a) includes controlling dispersing feeders, which charge the articles into the weighing hoppers, in such a manner that the quantity of articles charged into each weighing hopper will conform to the target charge quantity.

3. The weighing method according to claim 2, wherein said step (a) includes controlling vibration amplitude and vibration duration of the dispersing feeders.

4. The weighing method according to claim 2, wherein said step (a) includes computing the target charge quantity from the target weight value and number of weighing hoppers, and controlling the dispersing feeders in such a manner that the quantity of articles charge into each weighing hopper conforms to the target charge quantity.

5. A weighing apparatus for obtaining a collection of articles, the total weight of which substantially corresponds to a target value, by measuring the weights of batches of articles, charged into a plurality of weighing hoppers, using respective weight sensors, by selecting a combination of article batches giving a total weight value closest to the target weight value within preset limits based on the weights of the batches of articles measured by the weight sensors, and by discharging the selected articles from the weighing hoppers, said apparatus comprising:
   at least one auxiliary weighing hopper;
   an auxiliary weighing hopper weight sensor for measuring the weight of a batch of articles received in said at least one auxiliary weighing hopper;
   main control means for selecting a combination of article batches, which gives a total weight closest to the target weight value within preset limits, from the weight values measured by the weight sensors of the respective weighing hoppers and said auxiliary weighing hopper weight sensor, the selected combination including the batch of articles received in said at least one auxiliary weighing hopper, said main control means for discharging the batches of articles from the selected weighing hoppers and from said at least one auxiliary weighing hopper, and for computing, from the weights of batches of articles in weighing hoppers not participating in the selected combination, a quantity of articles to be charged into said at least one auxiliary weighing hopper; and
   auxiliary feed control means for charging said at least one auxiliary weighing hopper with a quantity of articles conforming to the computed quantity.

6. The weighing apparatus according to claim 5 wherein said main control means includes:
   combination control means for selecting the combination and for discharging the selected batches of articles; and
   auxiliary feed arithmetic means for computing the quantity of articles to be charged into said at least one auxiliary weighing hopper.

7. The weighing apparatus according to claim 6, wherein said combination control means generates a combination selection signal and wherein said auxiliary feed arithmetic means includes:
   a first circuit for weighting each unselected batch of articles based on a deviation between a target feed quantity for each of the weighing hoppers and the weights of batches of articles in weighing hoppers which do not participate in the selected combination, the latter being obtained on the basis of the combination selection signal produced by said combination control means; and
   a second circuit, operatively connected to said first circuit, for computing the quantity of articles to be charged into said at least one auxiliary hopper, based on the weighting values determined for the unselected batches of articles.

8. The weighing apparatus according to claim 7, wherein said first circuit includes:
- a comparator circuit for classifying the magnitude of the deviation into plural ranks of predetermined scope; and
- a weighting arithmetic circuit, operatively connected to said comparator circuit, for counting, rank-by-rank, the number of classified batches of articles, and for obtaining the weighting values by multiplying the weights determined for the ranks by the counted values for each rank.

9. The weighing apparatus according to claim 8, wherein said second circuit computes the quantity of articles based on the weighting values, the weight values obtained from the unselected weighing hoppers, the number of said at least one auxiliary weighing hopper and the target weight value.

10. The weighing apparatus according to claim 6, wherein said combination control means includes means for selecting a combination of article batches in the weighing hoppers giving a total weight value closest to a differential weight value found by subtracting the weight value of an article batch in said at least one auxiliary weighing hopper from the target weight value.

11. The weighing apparatus according to claim 10, wherein said at least one auxiliary weighing hopper comprises a pair of hoppers employed alternately.

12. A weighing method comprising the steps of:
 (a) charging articles to be weighed into a plurality of weighing hoppers;
 (b) measuring the weight of each batch of articles received in the respective weighing hoppers;
 (c) selecting, based on the measured weights, a combination of article batches giving a total weight value closest to a target weight value within preset limits;
 (d) discharging the selected article batches from the respective weighing hoppers to obtain a collection of articles the weight of which corresponds to the total weight value closest to the target weight value within preset limits;
 (e) computing a quantity of articles to be charged into an auxiliary weighing hopper, based on the weights of unselected article batches in weighing hoppers which do not participate in the selected combination determined in said step (c); and
 (f) charging the computed quantity of articles into the auxiliary weighing hopper;
 said step (a) including controlling the charging of the articles into the weighing hoppers on the basis of a target charge quantity which is obtained from the number of weighing hoppers, the number of auxiliary weighing hoppers provided separately of the weighing hoppers, and the target weight value;
 said step (c) including selecting a batch of articles received in one of the auxiliary weighing hoppers as an article batch included in the selected combination;
 said step (d) including discharging the article batch from the selected auxiliary weighing hopper and the article batches from the selected weighing hoppers to obtain the collection of the articles.

13. The weighing method according to claim 12, wherein said step (e) includes the substeps of:
 (e') weighting each unselected batch of articles based on the magnitude of a deviation between the target charge quantity and the weight value of each unselected batch of articles which does not participate in the selected combination; and
 (e") computing the weight of articles to be charged into the auxiliary weighing hopper using the weighting values determined for each unselected batch of articles.

14. The weighing method according to claim 13, wherein said substep (e') includes classifying the magnitude of the deviation into plural ranks of predetermined scope, and obtaining the weighting values by multiplying the numbers of article batches classified by the ranks by predetermined weighting factors for the ranks.

15. The weighing method according to claim 14, wherein said substep (e") includes computing the weight of articles to be charged into the auxiliary weighing hopper based on the weighting values, the weight values obtained from the unselected weighing hoppers, the number of the auxiliary weighing hoppers and the target weight value.

16. The weighing method according to claim 12, wherein said step (a) includes a replenishment charging step of controlling the charging of the articles into the weighing hoppers corresponding to the selected combination, with the target charge quantity serving as a target for the charging operation.

17. The weighing method according to claim 12, wherein said step (c) includes selecting a combination of article batches in the weighing hoppers giving a total weight value closest to a differential weight value determined by subtracting the weight value of an article batch in the auxiliary weighing hopper from the target weight value.

18. A weighing method for obtaining a collection of articles, comprising the steps of:
 (a) charging weighed batches of articles into hoppers;
 (b) charging an auxiliary weighed batch of articles into an auxiliary hopper;
 (c) selecting, based on the weights of the weighed batches of articles and the auxiliary weighed batch of articles, the auxiliary weighed batch of articles and the combination of weighed batches of articles giving a total weight value closest to a target weight value within preset limits;
 (d) discharging the selected weighed batches of articles and the auxiliary weighed batch of articles to obtain a collection of articles having a total weight which corresponds to the total weight value closest to the target weight value within preset limits; and
 (e) computing a quantity of articles to be charged into the auxiliary hopper, based on the weights of the unselected weighed batches of articles in the hoppers which do not participate in the selected combination determined in said step (c), said step (b) comprising charging the computed quantity of articles into the auxiliary hopper;
 said step (a) including controlling the charging of the weighed batches of articles into the hoppers on the basis of a target charge quantity which is obtained based on the number of hoppers, the number of auxiliary hoppers, and the target weight value.

* * * * *

UNITED STATES PATENT AND TRADEMARK OFFICE
CERTIFICATE OF CORRECTION

PATENT NO. : 4,508,186
DATED : APRIL 2, 1985
INVENTOR(S) : TAKASHI SASHIKI ET AL.

It is certified that error appears in the above-identified patent and that said Letters Patent is hereby corrected as shown below:

FRONT PAGE [57] ABSTRACT
line 6, "cles" should be --cle--.

Col. 3, line 57, after "opened" insert --so--.

Col. 4, line 3, "$A \leq B$" should be --$A \geq B$--.

Col. 8, line 1, "weighing" should be --pool hooper--; and "pool hopper" should be --auxiliary weighing--.

Col. 10, line 20, after "6)" insert --;--;
line 22, "," (second occurrence) should be --;--.

Col. 12, line 53, "$W_{s1}$" should be --$Ws_1$--.

Col. 14, line 44, "5" should be --5,--.

Signed and Sealed this

Third Day of September 1985

[SEAL]

Attest:

DONALD J. QUIGG

*Attesting Officer*    *Acting Commissioner of Patents and Trademarks - Designate*